April 19, 1966  M. A. MATALON  3,246,759
REGENERATION CONTROL FOR ION EXCHANGE BEDS
Filed April 5, 1963  2 Sheets-Sheet 1
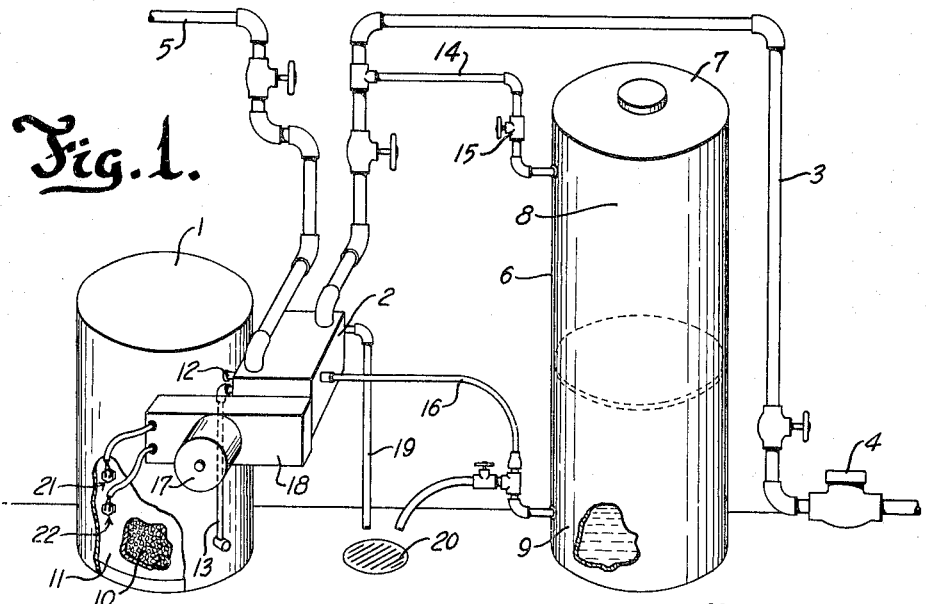
Fig.1.
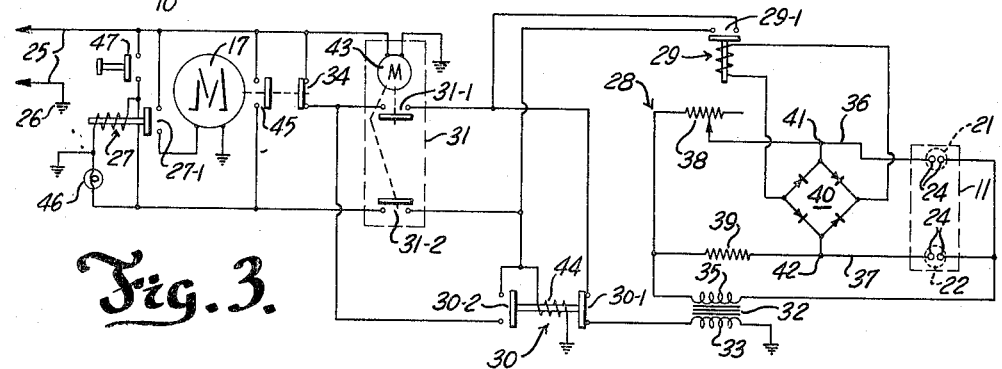
Fig.3.
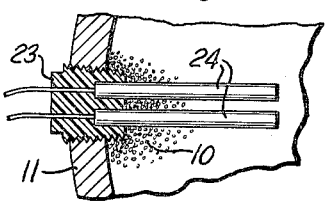
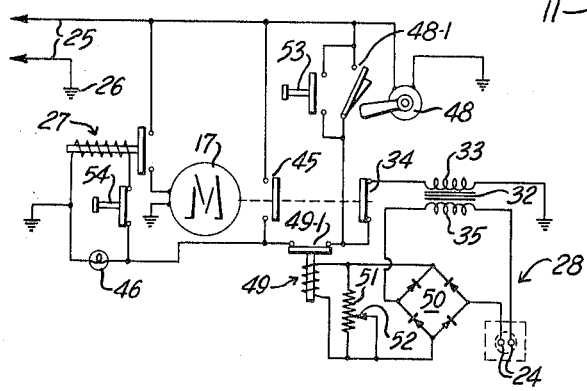
Fig.4.
Fig.2.
INVENTOR.
Morris A. Matalon
BY
Andrus & Starke
Attorneys INVENTOR.
Morris A. Matalon United States Patent Office 3,246,759
Patented Apr. 19, 1966

3,246,759
REGENERATION CONTROL FOR ION
EXCHANGE BEDS
Morris A. Matalon, Gardena, Calif., assignor, by mesne assignments, to Culligan, Inc., North Brook, Ill., a corporation of Delaware
Filed Apr. 5, 1963, Ser. No. 274,374
21 Claims. (Cl. 210—96)

This application is a continuation-in-part of applicant's application, Serial No. 859,663, which was filed on December 15, 1959, entitled Regeneration Control for Ion Exchange Beds, and now abandoned.

This invention relates to a regeneration control for an ion exchange bed and particularly relates to automatic detection of the necessity for regeneration of an ion exchange water softener and the like and the establishment of a signal which may be employed to institute an automatic regeneration cycle.

Hardness of water generally results from calcium and magnesium ion concentrations in the water. Water in residential dwellings, industrial plants, and the like is normally softened by passing the water through an ion exchange bed of base exchange softening minerals such as resin or zeolite to remove the magnesium and calcium ions. The resinous or zeolite bed is initially charged with sodium ions. As the hard water passes through the bed, the magnesium and calcium ions are exchanged for the sodium ions which pass into the water.

After an extended period of use, the sodium ions are substantially removed from the bed which is consequently no longer effective in removing the magnesium and calcium ions from the water. The bed must then be regenerated to remove the magnesium and calcium ions and to again saturate the bed with sodium ions.

Conventionally, the regeneration is accomplished by immersing the bed in a salt brine solution for a sufficient period to substantially remove all the calcium and magnesium ions and to again saturate the bed with sodium ions. The bed is then washed and rinsed with clear water to remove excess brine and leave the recharged bed in condition for again softening of water. The water system is then connected to the water softener to subsequently soften the water.

Automatic controls have been proposed for automatically sensing the necessity for regeneration of the bed and to establish an automatic regeneration cycle. The control automatically and sequentially connects the softener to a brine tank and the water supply line to establish the various steps in the regeneration cycle. The necessity of continuous checking of the water by the consumer and the time required to manually complete the regeneration cycle is eliminated. Although satisfactory sequence controls are available, present sensing units do not accurately detect the necessity for regeneration in a simple and positive manner to insure dependable performance.

Conventionally, timers have been employed to operate periodically to regenerate the bed regardless of the condition of the bed. Abnormal and excessive use of water in the system may deplete the sodium ions from the bed prior to the time for regeneration. Periods when the softener is ineffective and hard water is passed through the system would then result. If there is an abnormal non-use of water in the system, the bed is regenerated prior to the depletion of the sodium ions in the bed. This is expensive and wasteful. This would be particularly true in instances for example where the consumer is on a vacation and the regeneration control was not disconnected.

To overcome some of the difficulties inherent in present timing devices, automatic controls employing the difference in the conductivity of softened water and hardened water have been proposed. Sampling devices are connected in the fluid circuit to determine the conductivity of the water. Rate of water flow controls have also been proposed. However, such systems have not been widely employed for various reasons.

United States Patent 2,736,637 discloses a sampling unit to be connected in the discharge side of the softener to measure the conductivity of a separate resin sample. Periodically, the water is drained from the unit and the conductivity of the sample determined. A difference exists in the conductivity of the resin sample when saturated with calcium and magnesium ions and when saturated with sodium ions. To automatically check the activity of the softener, water is bled off by an intermittent valve system or by a siphon arrangement which continuously draws water through the test cell. The arrangement depends upon mechanical and hydraulic members with their inherent limited reliability and life. Further, the resistance of a cell is also dependent upon the contact between the resin and the electrodes. If for any reason the contact changes appreciably, the signal will change and may or may not give a necessary signal.

The present invention is based, in part, upon the realization that the activity of the resin bed is dissipated in more or less relatively distinct layers, and that consequently a determination of the conductivity of a downstream portion of the resin bed in the softener will give a direct and true indication of the necessity for regeneration.

The present invention provides an improved automatic and certain direct determination of the need for regeneration, using the concept of determining directly the conductivity of a portion of the resin or resin-water system of the water conditioning bed. Structure of the present invention directly and automatically senses a predetermined exhaustion level at which the bed should be regenerated. The detection is, therefore, made without modification of the hydraulic system in the water softener connection.

Generally, in accordance with the present invention, suitable electrode means are placed in the resin bed and connected in a detection circuit. Current is impressed on the circuit and the amplitude of the current is responsive to the conductivity or resistance of the resin-water system between the electrode means. A relatively high current flow is established in the presence of sodium ions in or on the resin. However, as the sodium ions are replaced with the magnesium and calcium ions, the conductivity of the resin decreases and the current flow decreases accordingly. At a preselected current level at which regeneration is to be made, automatic regeneration apparatus is triggered or a signal indicator actuated to inform the consumer that regeneration is necessary.

The present invention thus automatically and directly provides an accurate and true determination of the activity of the resin bed. The apparatus of the present invention may employ a complete electrically controlled sequence and is, therefore, adapted to rugged and relatively foolproof functioning.

In accordance with another important aspect of the present invention, the conductivities of portions of the resin bed spaced in the direction of water flow through the bed are determined and compared to establish an output signal incident to a preselected differential in the conductivity of the portions of the bed. This differential system compensates for all changes in the conductivity of the water because the two determinations are essentially equally affected by changes in the conductivity of the water.

In accordance with still another aspect of the present invention, the detection circuit may be intermittently connected to the power source to check for the necessity of regeneration and disconnected during the regeneration cycle. This reduces power consumption and protects the electrode means and the associated elements from the effects of continuous current flow.

The brine used during the regeneration cycle contains an exceedingly large sodium ion concentration and is a relatively excellent conductor. High currents may therefore result incident to filling of the water softener with brine during the regeneration cycle if the power source is not disconnected from the electrode means and is able to establish or furnish damaging currents. The resulting large current may destroy some of the components in the circuit sensing the conductivity of the resin.

Another feature of this invention is the automatic detection of iron fouling of the regeneration bed. Thus, water from different areas has a varying iron content. A water softening bed acts as a mechanical filter to remove the iron from the water. This will reduce the ion exchange effectiveness of the bed. The present invention will detect such iron fouling as a result of the change in conductivity adjacent one of the detection cells. This detection will also result in establishing a regeneration cycle which will be effective to remove the iron from the bed.

The present invention provides a simple and relatively inexpensive sensing control for establishing precisely and directly the condition of an ion exchange bed. The ion exchanger may be regenerated only and precisely when necessary to provide the most economical use of the salt. The present invention also provides a detection apparatus which may be constructed to be independent of the resistance of the liquid.

The drawings furnished herewith illustrate the best mode presently contemplated for carrying out the invention.

In the drawings:

FIG. 1 is a simplified diagrammatic illustration of a water softening apparatus connected to a main water supply system and having an automatic regeneration detection means and control constructed in accordance with the present invention;

FIG. 2 is an enlarged fragmentary sectional view illustrating a preferred electrode construction;

FIG. 3 is a schematic circuit diagram showing the automatic regeneration control circuit in acocrdance with an embodiment of the present invention employing a differential detection system;

FIG. 4 is an alternative circuit showing a detection system in accordance with the present invention relying upon automatic checking of a single portion of the resin bed;

Figure 5:
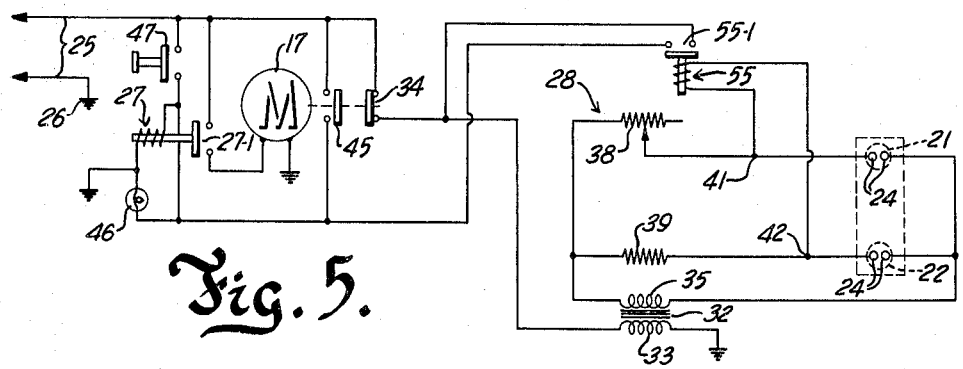
FIG. 5 is a view similar to FIG. 3 illustrating another embodiment of the invention employing differential detection.

Referring to the drawings and particularly to FIG. 1, a water softening installation in a typical residential water distribution system is shown generally including a water softener 1 which is connected by a motor-driven control valve 2 between a main water inlet pipe 3 coming from a water meter 4 and a discharge of water distribution pipe 5. The latter is connected to the cold water supply of the residential supply system. Softener 1 is adapted to replace calcium and magnesium ions in the incoming hard water with sodium ions to deliver soft water into the residential supply system. A salt storage tank 6 having a removable cover 7 is provided to store relatively large quantities of salt 8 which creates a supply of regeneration brine 9 in the lower portion of tank 6 for selective introduction into the softener 1.

The illustrated water softener 1 is a standard base ion exchange variety having a resin bed 10 supported within a tank 11. An upper water inlet 12 and a lower water outlet 13 are vertically spaced and are secured within the wall of tank 11. The inlet 12 and outlet 13 are normally respectively connected by valve 2 to the main water inlet pipe 3 and the water distribution pipe 5 to pass water downwardly through bed 10.

The resin bed 10 is normally initially saturated to a predetermined level with sodium ions by immersion within a salt brine for a predetermined period. As raw, hard water passes downwardly between tank inlet 12 and tank outlet 13, the calcium and magnesium ions in the water are taken up by the bed 10 in exchange for sodium ions which pass into solution in the water, in a conventional and well-known manner. Eventually the sodium ions in bed 10 are substantially depleted and the bed 10 must again be immersed within a salt brine solution from the salt storage tank 6 for a short period during which sodium ions again replace the calcium and magnesium ions on the resin bed 10.

A branch inlet pipe 14 connects the upper end of the salt storage tank 6 to the main water inlet pipe 3. A valve 15 is connected in pipe 14 to shut off the water from pipe 3 when refilling the salt storage tank 6. A brine line 16 is connected to the lower end of the salt storage tank 6 and to the control valve 2 to allow selective withdrawal of brine from the tank 6 and introduction into the softener 1 to regenerate the bed 10.

The control valve 2 is of any suitable variety which is adapted to establish a regenertaion cycle after initial triggering of the valve. For example, a suitable water softening motor-driven control having a manual start or triggering means is shown in United States Patent 1,928,384 which issued September 26, 1933 to McCanna.

In illustrated valve 2 and the valve of Patent 1,928,384, a motor 17 is adapted to sequentially drive the control valve 2 to automatically establish the several operations in the regeneration cycle as more fully described hereinafter.

The motor 17 is any conventional motor and is shown in FIG. 1 supported by housing 18 for the motor and suitable electroresponsive motor control elements, not shown in FIG. 1. The energization of motor 17 is controlled by the ion condition of bed 10 to establish the regeneration cycle incident to a predetermined depletion of the activity of the resin bed 10.

Generally, the valve 2 is adapted to sequentially disconnect the softener 1 from the main water inlet pipe 3 and water distribution pipe 5 and to connect the softener to the salt storage tank 6. The valve 2 then connects the brine line 16 to the softener 1 to fill the softener tank 11 with salt water brine 9. A drain line 19 is connected to the control valve 2 and leads to a floor drain 20 in the illustrated embodiment 1 of the invention. As the salt water brine fills the water softener 1, the water in the softener is discharged through the drain line 19 to the floor drain 20. After a predetermined period to allow replacement of the calcium and magnesium ions with sodium ions, the brine line 16 is disconnected from the water softener 1 and the main water inlet pipe 3 is connected to force water upwardly through the softener 1 and then out through the drain line 19 to wash the brine from softener 1 and loosen the resinous bed 10. Finally, a down rinse or flow of water is established through the softener 1 to thoroughly wash out all the excess brine after which the softener 1 is series connected between main water inlet pipe 3 and the water distribution pipe 5.

The control valve 2 normally includes an automatic raw water bypass, not shown, which creates a hard water bypass from pipe 3 to the pipe 5 and thus to the cold water faucets during the regeneration cycle. A suitable signal is preferably established to inform the consumer that the regenerating cycle is in progress so that hot water will not be drawn from the system. This prevents introduction of hard water into the hot water tank where it is particularly undesirable in normal use.

In accordance with the present invention as illustrated in FIGS. 1–3, the motor 17 is automatically triggered at a preselected depletion of the activity of bed 10 as determined by comparing the conductivity of flow spaced portions of the resin in bed 10. A pair of test cells 21 and 22 are secured within suitable openings in the softener tank 11 in vertically spaced relation adjacent the medial portion of the bed 10 to form an upper electric cell and a lower electric cell, respectively. The precise vertical location of the test cells 21 and 22 is dependent upon the maximum hardness of water which the softener is designed to treat as well as the dimensions of the resin bed. As more fully described hereinafter, applicant has found that in a standard zeolite bed which is 16 inches deep and 8 inches in diameter, the location of the lower cell 22 approximately 2 to 4 inches from the bottom of the resin bed and the upper cell 21 approximately 4 inches above the lower cell establishes satisfactory operation. The test cells 21 and 22 are connected by suitable leads in a control circuit for the motor 17, as schematically shown in FIG. 3.

Referring particularly to FIG. 2, each test cell 21 and 22 includes a plastic plug 23 having a tapered thread on the outer surface which is adapted to be threaded into a correspondingly inwardly tapering opening in the tank 11. A pair of horizontally spaced electrodes 24 are embedded within the inner end of the plastic plug 23 and supported within the bed 10 with the connecting leads projected axially outwardly through the body of the plastic plug 23 for connection in the control circuit for motor 17.

The plug 23 is formed of nylon or any other suitable plastic which establishes a liquid-tight joint upon threading of the plug tightly into the opening.

The electrodes 24 are preferably a suitable corrosion-resistant material which is not readily corroded by the softened water or by electrolytic currents established between the electrodes. Corrosion of the electrodes would, of course, require replacement to maintain operation of the automatic control. However, generally corrosion is much more objectionable because a thin film of corrosion products builds up on the electrode surface and causes a change in the conductivity of the circuit. As appears more fully hereinafter, the response of the control circuit is dependent upon a change in the conductivity of the circuit and consequently the circuit would malfunction in the presence of a film on the electrodes. If means are provided to keep the electrodes clean, slight corrosion might be tolerated by selecting the electrodes to have a useful life of sufficient duration. Platinum electrodes and graphite electrodes exhibit highly satisfactory performance and have a life expectancy greater than that of the conventional water softener. Graphite is particularly useful as a practical and commercial product.

In the softening process, the sodium ions in the resin bed 10 are exchanged for magnesium and calcium ions in the water in successive, relatively thin layers of resin; progressing through the bed in the direction of water flow. Although the successive layers overlap and adjacent layers may function in differing degrees simultaneously, the greater share of the exchange process is confined to a relatively thin resin layer.

The pair of test cells 21 and 22 form regeneration control cells dependent upon the state of the resin between the corresponding electrodes 24 of each cell to establish a triggering signal when regeneration is required. The conductivity of the resin-water system of each cell is noticeably greater in the presence of sodium ions than in the presence of magnesium and calcium ions. The resin in the upstream or upper cell is exhausted prior to the resin in the downstream or lower cell and consequently the conductivity of the respective cells differ after an indeterminate flow of water. The change in conductivity of the upper and lower cells is compared to trigger an automatic regeneration cycle.

Referring particularly to FIG. 3, a control circuit for the motor 17 is schematically illustrated including the several test cells 21 and 22 and various other operating components in accordance with the present invention.

Incoming power lines 25 of the conventional 115 volts, 60 cycle alternating current normally found in residential areas constitute the power input to the illustrated control circuit. One of the power lines 25 is shown grounded as at 26 and the various components in the circuit have one side ground to complete the circuit to the corresponding element. The grounded side is shown by a corresponding symbol and no further specific description or numeral is given to such showings.

Generally, the control circuit includes a main contactor or solenoid 27 connected in an energizing circuit to control motor 17. A sensing circuit 28 which includes test cells 21 and 22 is connected to control the energization of solenoid 27 through a softener controlled relay 29 and a holding relay 30. A motor-driven timer 31 includes two sets of contacts 31–1 and 31–2 which are connected respectively in the input to the sensing circuit 28 to intermittently energize the circuit and in the circuit between solenoid 27 and holding relay 30 to intermittently condition the solenoid circuit for energization.

The motor solenoid 27 includes a set of normally open contacts 27–1 connected in series with motor 17 across the power line 25. The motor solenoid 27 is a conventional safety device which electrically isolates motor 17 from the other components and eliminates the flow of motor current through the latter. The solenoid 27 is controlled by the sensing circuit 28 to initiate energization of motor 17 and to establish a regeneration cycle during a period timer contacts 31–2 are closed.

The sensing circuit 28 is connected to suply lines 25 by a stepdown transformer 32 to establish a low voltage, alternating current input. The transformer 32 includes a primary winding 33 connected across the power lines 25 in series with a set of normally closed contacts 30–1 of holding relay 30, the timer switch contacts 31–1 and a normally closed motor actuated switch 34. A secondary winding 35 is magnetically coupled to the primary winding 33 and is adapted to establish a low voltage alternating current source incident closing of the timer contacts 31–1.

The illustrated sensing circuit 28 is a Wheatstone bridge circuit including an upper cell branch 36 and a lower cell branch 37 connected in parallel circuit across the transformer secondary 35. Each branch 36 and 37 includes one of the cells 21 and 22 with the corresponding electrodes 24 connected in series in the branch circuit. A variable resistor 38 is connected in series with the electrodes 24 of the upper cell 21 and a fixed resistor 39 is connected in series with the electrodes 24 of the lower cell 22. The test cells 21 and 22, respectively, sense the conductivity of the adjacent portions of the resin bed 10 and adjust the current flow in the branches 36 and 37 accordingly.

A full-wave rectifier 40 has its input connected to junctions 41 and 42 of branches 36 and 37 which are established by the respective connections of the resistors 38 and 39 to the corresponding test cells 21 and 22. The output of the rectifier 40 is connected to energize the relay 29. The relay 29 includes a set of normally open contacts 29–1 which are connected in an energizing circuit with the holding relay 30 to control energization of the motor solenoid 27.

Assuming the conductivity of the bed adjacent the upper and lower pairs of electrodes 24 of the test cells 21 and 22 is the same and the resistor 38 is adjusted to the value of the resistor 39, the potential of junctions 41 and 42 is the same. No potential difference is impressed across the rectifier 40 and consequently no current is supplied to the relay 29. Normally open contacts 29–1 remain open and the holding relay 30 is in standby position.

As the softening process proceeds, the conductivity of the upper portion of the bed 10 adjacent the electrodes 24 of the upper test cell 21 decreases first and the current flow decreases accordingly. The potential of junction 41 of the branch 36 is correspondingly changed and a potential difference appears across the rectifier 40. Current flow through the rectifier 40 increases and incident substantial exhaustion of the activity of this portion of the bed, the current value through the relay 29 rises to a level at which the relay contacts 29–1 closes and complete the energizing circuit for holding relay 30.

If the conductivity of the incoming water increases or decreases, the bridging effect of the water on each cell changes in the same magnitude and direction and does not, therefore, effect the operation of the circuit. The bridge-type circuit with the test cells 21 and 22 spaced in the direction of water flow, therefore, automatically compensates for variations in conductivity, of the water which may exist in different geographical areas and in different seasons of the year in some areas of the country.

Generally, the spacing of the electrode pairs is a compromise between a maximum separation and very close placement. Maximum spacing, while providing maximum current differential, may cause the device to regenerate too soon. Minimum spacing may not establish a sufficient current differential to effectively operate the circuit. As previously described, a spacing of the upper cell 21 approximately four inches above the lower cell 22 establishes reliable operation in the standard softener bed.

The resistor 38 is made variable to allow initial setting of the sensing circuit 28 and to allow adjustment to compensate for manufacturing tolerances and inherent variation in the cell construction. Further, relay 29 may require a greater energization level than results from the potential established between junctions 41 and 42 incident exhaustion of the bed adjacent test cell 21. The resistor 38 may be adjusted to establish an initial unbalance which, when added to that arising from the action of the upper and lower cells 21 and 22, is sufficient to actuate relay 29. Consequently, relatively low cost and readily available components can be employed.

The timer 31 constitutes an override control to limit energization of the sensing circuit 28 to predetermined time periods. The illustrated timer 31 includes a motor 43 which is connected directly across the power lines 25 for continuous energization. The motor 43 is preferably a small, synchronous clock-type motor which establishes a precise timed output movement. The timer motor 43 is suitably coupled to contact 31–1 as by a conventional step-down gear system, not shown, to periodically close the contacts and impress a voltage upon transformer 32 to check the activity of the resin bed 10.

The status of the resin bed 10 is checked by closing of contacts 31–1 within successive time intervals which are less then the minimum flow time which could cause the conductivity of the resin between the electrodes 24 of the lower cell 22 to decrease to the same value as the conductivity of the resin between the electrodes 24 of the upper cell 21. This is necessary since corresponding exhaustion would result in balancing of the potential of junctions 41 and 42 and thus simulate the condition of maximum activity and prevent energization of relay 29 and the holding relay 30.

Relay 30 includes a winding 44 which is connected to power lines 25 in series with the set of normally open relay contacts 29–1, the timer contacts 31–1 and the motor actuated switch 34. Relay 30 also includes a set of latch contacts 30–2 which are connected in series parallel with the relay winding 44 and the timer contacts 31–1 and relay contacts 29–1 across the power lines 25 through the motor operated switch 34. When relay winding 44 is initially energized and latch contacts 30–2 close, relay winding 44 is subsequently energized independently of timer contacts 31–1 and the sensing relay contacts 29–1. Relay 30 is thereby maintained energized until a regeneration cycle is started and motor 17 opens the switch 34 to break the holding circuit. The switch 34 is suitably coupled to motor 17 as by a cam, not shown, to open after the motor 17 is energized and the regeneration cycle established.

The latch contacts 30–2 of holding relay 30 are also connected in series with solenoid 27 and the timer contacts 31–2 to energize the solenoid incident simultaneously closing of holding relay contacts 30–2 and timer contacts 31–2.

The timer motor 43 is coupled to contacts 31–2 to close the contacts during periods when regeneration causes a minimum inconvenience to the consumer. Thus, contacts 31–2 may be closed during the afternoon or early morning hours when water is not normally withdrawn from the system. Therefore, even though actuation of the sensing circuit 28 establishes a regeneration signal, the regeneration cycle cannot be established until contacts 31–2 also close. A regeneration signal energizes relay 29 which closes the associated contacts 29–1 and energizes the holding relay 30 which closes contacts 30–2. Relay 30 is then maintained energized through holding contacts 30–2 until after the regeneration cycle is established.

Subsequently, when timer 31 closes the associated contacts 31–2, the solenoid 27 is energized through the following circuit: from lines 25 through the switch 34 and closed contacts 30–2 and then through timer contacts 31–2 and solenoid 27 to ground. Solenoid 27 closes contacts 27–1 and completes a connection of motor 17 across power lines 25.

A motor latch switch 45 is connected in series with solenoid 27 and in parallel with the holding relay contacts 30–2 to establish solenoid energizing independently of the contacts. Switch 45 is biased to the open position and coupled to the motor 17 in any suitable manner, not shown. The motor 17 closes switch 45 after a predetermined motor energization period to maintain solenoid 27 energized and to thereby establish a timed drive of valve 2 by motor 17 to complete the regeneration cycle. At the end of the cycle, the motor 17 opens switch 45 and breaks the latch circuit to the motor 17 to return the softener and the control circuit to standby.

A pilot lamp 46 is connected in parallel with the solenoid 27 to establish a visual indication of the operation of the regeneration cycle.

The timed regeneration cycle established by contacts 31–2 of timer 31 is particularly permissible in accordance with the present invention because the regeneration can be accurately established to take place at some level above complete depletion of sodium ions from the bed 10 without any danger of excessive saturation. The softener 1 then includes a reserve and can be regulated to issue soft water at all times even though the regeneration cycle is time controlled.

Relay 30 includes the second set of contacts 30–1 which are connected in series with the primary 33 of the step-down transformer 32. The holding relay contacts 30–1 are normally closed and complete the circuit to primary 33 whenever the timer contacts 31–1 are also closed. However, when winding 44 is energized, contacts 30–1 are held open and disconnect the primary 33 and consequently the sensing circuit 28 from the power lines 25. This eliminates subsequent current flow in the sensing circuit 28 until the start of the regeneration cycle. When the regeneration cycle begins, the switch 34 opens and disconnects the sensing circuit 28 from the power lines 25 and resets the holding relay 30.

A push button switch 47 connects solenoid 27 directly to power lines 25 to establish an independent energizing circuit for the solenoid. The push button switch 47 is used when the brine tank 6 is depleted and does not provide the necessary regeneration. The consumer is placed on notice as soon as hard water passes into the output line 5 because of the difference of hard and soft water. The brine tank 6 is manually recharged with salt to re-establish the source of brine. The illustrated softener 1 cannot then be automatically regenerated because the bed 10 is essentially completely depleted and the test cells 21 and 22 have substantially the same conductivity and establish a similar potential at junctions 41 and 42 of the sensing circuit 28. The push button switch 47 is therefore manually operated to establish the initial energization of motor 17 which closes the associated contacts 45 and establishes the regeneration cycle.

The operation of the embodiment of the invention illustrated in FIGS. 1–3 is now summarized.

The several connections of the softener 1 as shown in FIG. 1 are completed and the power lines 25 connected to the control circuit which is housed within housing 18.

Assuming the bed is fully charged with sodium ions, the incoming water flows downwardly through the resin bed 10 and exchanges the magnesium and calcium ions for the sodium ions. The sodium ions in a thin top layer of the bed 10 are first given up to the water in exchange for calcium and magnesium ions. As the first layer becomes substantially depleted, an immediately adjacent layer becomes effective. The softening process thus continues downwardly through the bed 10. The successive layers do overlap slightly but are generally quite distinct.

With the bed fully charged, the upper and lower cells 21 and 22 have the same conductivity and consequently the sensing circuit 28 is in balance. That is, the potential of junctions 41 and 42 of the circuit 28 are the same for any given impressed voltage from the transformer 32.

The timer motor 43 is continuously driven to intermittently close contacts 31–1 and 31–2.

The closures of contacts 31–1 are relatively closely spaced to insure checking of the activity of the bed 10 before the layers of the bed 10 which contain the test cells 21 and 22 are both depleted and inactive. As previously noted, this prevents balancing of the sensing circuit 28, as when the bed is fully charged, when the bed in fact needs regeneration. Thus, the contacts 31–1 may typically be closed three times each hour.

Each time contacts 31–1 close, power is impressed upon transformer 32 to supply current to the sensing circuit 28 when contacts 30–1 are still closed.

If the bed 10 is fully charged, the pairs of electrodes 24 and the bridging resin forming test cells 21 and 22 have the same conductivity and consequently branches 36 and 37 of the sensing circiut 28 are similar. Junctions 41 and 42 are at the same potential, no current flows through the rectifier 40 and relay 29 and consequently relay contacts 29–1 remain open.

However, if the resin in the layer of bed 10 adjacent the electrodes 24 of the upper cell 21 is inactive, the conductivity of the corresponding cell decreases and reduces the current flow through the branch 36 of sensing circuit 28. Consequently, the potential of junction 41 changes and a potential difference is impressed upon the rectifier 40 to establish a current flow through relay 29. The relay contacts 29–1 close and condition the control circuit for regeneration.

The difference in current between branches 36 and 37 may be amplified by suitable selection of electrodes 24 because of the heating of the resin between the respective pairs of electrodes 24 by the current flow established. The conductivity of the resin changes with temperature. When the bed is fully charged and the same current flows in branches 36 and 37, the resin adjacent the upper and lower pairs of electrodes is equally heated. However, as the conductivity of the upper cell decreases, the current decreases. The heating effect of the current varies inversely with the conductivity and directly with the square of the current. Thus, the current decrease reduces the heating effect more than the conductivity decrease raises the heating effect. The net result is to increase the temperature of the resin between the lower pair of electrodes 24 of cell 22 relative to the resin adjacent cell 21 which further increases the current in branch 37 and thereby increases the potential difference between junctions 41 and 42.

In order to obtain the noted amplification, the electrode area must be sufficiently small such that the impressed voltage across the electrodes 24 establishes a current density which is sufficient to appreciably heat the resin. Thus, if large electrodes 24 are employed, the current density is low and the heat rise in the bridging resin is correspondingly small. With the previously described dimensions for bed 10 and location of test cells 21 and 22, electrodes 24 which are spaced ½ inch apart, have an effective length of 2 inches and a diameter of 3/16 inch worked well at no flow conditions when 35 volts of alternating current was impressed upon the electrodes. If the sensing is established when water is flowing through the softener, the heating effect is not present because of the cooling of the resin by the flowing water. In view of the possible variable nature of the heating effect, the unit is preferably designed to operate at the lowest conductivity water conditions in the absence of any heating effect. The unit cannot then give a false signal if extraneous matter causes a slight increase in the resistance of one cell.

The change in the conductivity of bed 10 may be in the order of 125% although in general practical applications 50% can be expected. This is true because the bed 10 is generally never permitted to be completely exhausted and never completely saturated with sodium ions. The effectiveness of a softener with a substantially degenerated bed is quite low. Further, to saturate the bed above 70 or 80% is inefficient. Consequently, a compromise is normally used.

The water further maintains a bridge between the resin and the electrodes 24 and effectively maintains a constant contact area regardless of the actual physical contact between the adjacent particles of the resin and the electrodes 24.

The current change in the present invention is relatively sharp because the upper pair of electrodes is placed in one layer of the bed. For example, in the illustrated embodiment of the invention, the decrease in sodium ions adjacent the uppermost portion of the bed has no effect on the current flow in the control circuit. It is only when the ion exchange occurs adjacent the upper pair of electrodes that any noticeable change in current appears.

With the present invention, the bed may, therefore, be allowed to exhaust to a predetermined range within which regeneration is established. This allows the most economical use of salt. Further, there will never be excessive regeneration of the bed because the regeneration cycle always begins with the bed within the same range.

The conductivity of water within softener 1 equally effects the resin-water system of the detection cells adjacent the upper and lower cells. Consequently, the illustrated control is independent of the hardness or temperature of the water. The actuation of relay 29 then accurately and directly indicates the necessity of regenerating the softener 1.

When relay 29 is actuated to close contacts 29–1 as described above, the following circuit is completed to holding relay 30: from power line 25 through the motor actuated contacts 34 and timer contacts 31–1 to relay contacts 29–1. The circuit continues directly to relay winding 44 of relay 30 and then to ground.

The relay contacts 30–2 then close and complete the following energizing circuit to relay winding 44: from power lines 25 through contacts 34 and contacts 30–2 directly to winding 44 and then to ground. Relay winding 44 is consequently maintained energized until contacts 34 are opened by operation of the valve drive motor 17.

Relay 30 also includes the normally closed contacts 30–1 in the energizing circuit to transformer 32. Contacts 30–1 open incident operation of relay 44 and break the circuit to transformer 32 and thus to sensing circuit 28. The sensing circuit 28 is thus maintained inactive until a regeneration cycle is established.

As previously described, timer contacts 31–2 and motor solenoid 27 are connected in a series circuit with relay contacts 30–2 and in parallel with relay winding 44. Closing of timer contacts 31–2 when contacts 30–2 are closed results in energization of the solenoid 27 and completion of the circuit to motor 17 to start the regeneration cycle.

Although contacts 31–2 may not close for some time after the closing of contacts 29–1 and the energizing of relay 30, the location of test cells 21 and 22 is preferably selected to allow continued effective operation of the softener 1 under all usual operation.

After energization of motor 17, the associated switch 45 is closed and the switch 34 is opened.

The opening of contacts 34 breaks the latch circuit to relay 30 which opens contacts 30–2 and closes contacts 30–1.

The contacts 30–2 then break the energizing circuit to solenoid 27. However, the closing of switch 45 establishes an independent energizing circuit to maintain motor 17 operating for the regeneration cycle.

Although the closing of contacts 30–1 incident to opening contacts 34 again partially completes the input connection to transformer 32 in the sensing circuit 28, the opening of contacts 34 simultaneously breaks the same circuit and thus prevents energizing of the sensing circuit 28 during the regeneration cycle.

The motor 17 drives the valve 2 in any conventional or suitable timed relation to drain the softener and fill it with brine from storage tank 6 to recharge the bed 10. The valve 2 is then driven to drain the brine and wash the bed 10 of all excess brine after which the softener is connected to incoming pipe 3 and discharge pipe 5.

At the end of the regeneration cycle, motor 17 opens switch 45 to break the self latch circuit to motor solenoid 27. The solenoid 27 is then de-energized and motor 17 and valve 2 returned to standby.

The contacts 34 are then closed by motor 17 to complete the cycle and to allow energizing of the sensing circuit 28 for successive checking of the bed 10, as previously described.

Referring particularly to FIG. 4, another embodiment of the invention is schematically illustrated wherein a single downstream portion of the resin bed 10 is periodically checked to establish a regeneration cycle. Corresponding elements in FIGS. 3 and 4 carry corresponding numbers for purposes of clarity and simplicity of explanation.

Referring particularly to FIG. 4, the sensing circuit 28 is connected to power lines 25 through a transformer 32. The primary 33 of transformer 32 is connected to power lines 25 in series with the motor operated switch 34 and a set of contacts 48–1 of a timer 48 for periodic energization of circuit 28.

Timer 48 is generally similar to timer 31 but has only the one set of contacts 48–1 which are actuated once or twice each day when regeneration is acceptable.

A triggering relay 49 is connected in the output circuit of sensing circuit 28 and includes a set of normally closed contacts 49–1 which are connected to control solenoid 27 for motor 17.

Solenoid 27 and paralleled pilot lamp 46 are connected to power lines 25 in series with contacts 49–1 of relay 49 and the timer contacts 48–1. Consequently, if contacts 48–1 and 49–1 are simultaneously closed, solenoid 27 is energized to initiate the regeneration cycle.

The latch switch 45 for motor solenoid 27 is connected in parallel with contacts 48–1 and 49–1 and establishes an independent energizing circuit after initial triggering of motor 17. The previously described regeneration cycle is established and completed, therefore, incident predetermined energization of motor 17.

The switch 34 is opened by motor 17 to prevent energization of sensing circuit 28 during the regeneration cycle, as in the embodiment of FIG. 3.

The sensing circuit 28 of FIG. 4 includes a single pair of electrodes 24 embedded within a downstream portion of the resin bed 10. The electrodes 24 are mounted within the tank 11 as previously described and located within a preselected downstream operating layer of bed 10 to condition the control circuit for regeneration when the associated layer becomes inactive. The layer of bed 10 at which electrodes 24 are located is selected somewhat upstream to allow continued softening of water in the event the bed becomes inactive some time prior to closing of contacts 48–1.

A full-wave rectifier 50, shown in the conventional manner, is connected between the secondary 35 and the relay 49 to supply a direct current suitable for actuation of the softener controlled relay 49.

The input to the full-wave rectifier 50 is connected in series with the pair of electrodes 24 directly across the secondary winding 35. The pair of electrodes 24 and the resin therebetween constitute a variable conductor which determines the current flow in the circuit.

The resistance or conductivity of the resin-water system between the electrodes 24 is proportional to the quantity of sodium ions and calcium ions on the corresponding resin, as in the previous embodiment. Consequently, the current flowing in the circuit is a direct function of the regenerating status or effectiveness of the bed 10 and constitutes a control signal for triggering the regeneration cycle.

The output of the rectifier 50 is impressed across the relay 49 to energize the relay in accordance with the current determined by the conductivity of the resin-water system bridging the electrodes 24. The circuit is designed to establish a current flow which energizes relay 49 to hold contacts 49–1 open in the presence of sodium ions on the resin between electrodes 24. The replacement of the sodium ions with magnesium and calcium ions, decreases the conductivity and when timer contacts 48–1 close to energize the sensing circuit 28, relay 49 is not energized sufficiently to open contacts 49–1 which remain closed and provide a signal for regeneration.

A variable resistor 51 is connected in parallel with relay 49 and constitutes a shunt or bypass for an adjustable portion of the current which is flowing in the circuit as established by the conductivity of the cell. The resistor 51 includes a movable tap 52 which short circuits an adjustable portion of resistor 51 for selective connection of the resistor 51 in circuit. The total current flowing in the circuit is determined by the effective conductivity of the resin-water system bridging electrodes 24 and this current is divided between the relay 49 and the paralleled variable resistor 51 as determined by the setting of the tap 52.

The conductivity of the resin-water system is dependent upon the type and concentration of ions carried by the resin. Sodium ions increase the conductivity while magnesium and calcium ions decrease the conductivity of the resin-water system. By adjusting the resistor 51, the proportion of the current which flows through relay 49 for a particular conductivity of the resin is controlled.

A push button switch 53 is connected in parallel with the timer contacts 48–1 to bypass the contacts during the initial setting of the variable resistor 51.

A normally closed switch 54, which may be coupled to switch 53 for simultaneous operation, is connected in the circuit to the solenoid 27 to break the circuit during initially conditioning of the apparatus. This prevents establishment of the regeneration cycle.

To establish the point of the bed activity which establishes a signal for regeneration, the bed 10 is first completely exhausted. The tap 52 of variable resistor 51 is positioned at maximum water hardness; that is, to short circuit the resistor 51 and consequently close the contact 49–1. The tap 52 is carried by a movable dial, not shown, calibrated in units of hardness or the like.

Tap 52 of resistor 51 is next moved in the direction of decreasing hardness thus increasing the current in relay 49 until contacts 49–1 open and the pilot lamp 46 goes off. The resistor tap 52 is then turned back a couple of units on the dial, not shown, such that the portion of the resistor 51 connected in circuit is reduced and the relay current is reduced. Consequently, relay 49 is only energized when the total current increases sufficiently to establish an operative current to relay 49. This occurs when the bed is effective to soften the water. The triggering circuit is then in condition to establish a regeneration cycle each and every time the activity of the bed 10 adjacent electrodes 24 is reduced to the predetermined level.

The switches 53 and 54 are released to establish the automatically operating circuit and the softener 1 is subsequently automatically regenerated whenever timer 48 closes the contacts 48–1 and the bed 10 adjacent electrodes 24 is ineffective.

The conductivity of various waters may vary substantially and the effective conductivity of the cell may, therefore, be different in the several waters. The shunt control established by resistor 51 allows adjustment to compensate for this difference in the initiation of the regeneration. Consequently, relay 49 may be the same for all waters. The resistor 51 also prevents excessive current flow and insures dropping out of the control relay.

The operation of the water softening control illustrated in FIG. 4 is summarized as follows:

Assume the resin bed 10 is completely charged with sodium ions. The effective conductivity of the resin-water system is then relatively great and a substantial current flows in the triggering circuit and through the relay 49 to hold contacts 49–1 open. Consequently, the circuit to solenoid 27 is maintained open.

The softener control valve 2 then connects the main water inlet pipe 3 and the water distribution pipe 5 to the upper and lower end of the tank 11 to cause the incoming water to pass downwardly through the resin bed 10. In passing through the bed 10, magnesium and calcium ions are exchanged for sodium ions and the water is softened as previously described.

The continuous or intermittent flow of water downwardly through the resin bed 10 progressively exhausts the sodium ions in the bed 10, generally in slightly overlapping layers beginning at the uppermost portion of the bed.

Consequently, after an unpredictable flow of water through the bed 10, the sodium ions in the bed immediately adjacent the electrodes 24 have been exchanged for magnesium and calcium ions. The precise quantity of water which flows through the bed 10 before regeneration is required is dependent upon the temperature and hardness of the water, the continuity of flow and the like. However, the present invention is not dependent upon determining the flow and it need not be considered.

The conductivity of the bed 10 between the electrodes 24 decreases as the magnesium and calcium ion concentration increases and consequently the current flow therethrough is reduced. When the effective conductivity of the resin-water system between electrodes 24 drops to the level preset by the position of tap 52 of resistor 51, the current is low and the relay 49 is insufficiently energized to open contacts 49–1. The contacts 49–1 remain closed and complete the circuit to the solenoid 27 when the timer contacts 48–1 close.

The solenoid 27 is then energized to close the associated contacts 27–1 which complete the power connection of motor 17 and establishes a regeneration cycle for regenerating softener bed 10, as previously described.

In the embodiments of the invention illustrated in FIGS. 3 and 4, a timing device is employed to establish intermittent sensing of the softener bed 10. This is desirable in that it prevents electrolytic corrosion of the electrodes and the building up of resistive films upon the outer surface of the electrodes. However, as noted particularly in the bridge circuit of FIG. 3, it does require the necessity of a timer 31 and a holding relay 30.

In FIG. 5, a bridge-type sensing circuit 28 employing a continuous current application with an alternating current output is illustrated in accordance with the present invention. Corresponding elements in the embodiment of the invention illustrated respectively in FIGS. 3 and 5 carry corresponding numbers. The description of the embodiment illustrated in FIG. 5 is given to the extent necessary to clearly understand the operation of the embodiment illustrated in FIG. 5.

Referring particularly to FIG. 5, the valve drive motor 17 is connected to the power lines 25 and controlled by a solenoid 27 as in the embodiment of FIG. 3. The sensing circuit 28 of FIG. 5 generally corresponds to that shown in FIG. 3 except that the rectifier 40 and D.C. relay 29 are replaced with a single alternating current relay 55.

The primary winding 33 of transformer 32 is connected to the power lines 25 in series with the motor actuated switch 34. Consequently, the sensing circuit 28 is continuously energized and continuously senses the activity of the softener bed 10. The sensing circuit generally functions in the same manner as the sensing circuit 28 of FIG. 3 to energize the relay 55 whenever the activity of the resin-water system which constitutes a portion of the test cell 21 decreases to a preselected inactivity or exhaustion. Thus, normally the junctions 41 and 42 to which the relay 55 is connected are at the same potential. However, when the activity of the resin-water system constituting a part of test cell 21 is exhausted, the potential of junction 41 changes and the differences in potential between junctions 41 and 42 establish a current flow through relay 55 which is sufficient to actuate the relay to close its associated contacts 55–1.

The contacts 55–1 of relay 55 are connected directly in series with the solenoid 27 and the motor actuated switch 34 across the power lines 25. Consequently, whenever the relay contacts 55–1 close, the solenoid 27 is energized to close the associated contacts 27–1 and the regeneration cycle as previously discussed is immediately established. The motor 17 simultaneously closes switch 45 and opens switch 34 to establish a latch to the motor 17 and to break the input to the sensing circuit 28.

The embodiment of the invention illustrated in FIG. 5 is generally somewhat simpler in construction and eliminates the timer 31 and the holding relay 30 of the embodiment shown in FIG. 3. However, A.C. relay 55 must be relatively sensitive and the continuous application of current on the electrodes may tend to shorten the life of the electrodes somewhat.

A low voltage generally in the order of 12 volts is desirable to reduce the current density in the test cells 21 and 22 and consequently reduce the corrosion of the electrodes 24. In an alternating current sensing circuit, graphite electrodes provide a satisfactory working life and are particularly desirable because corrosion does not establish a resistive film on the surface of the electrodes. The continued application of current will not, therefore, reduce the life of the electrode to a commercially impractical period.

In the illustrated circuits of FIGS. 3–5, alternating current flows through the respective test cells formed by the electrodes 24 in the adjacent bridging resin. The alternating current reduces the tendency of depositing lime upon the electrodes with the consequent change in the conductivity of the cell. The alternating current flow between the electrodes is, therefore, generally preferred over direct current flow. If means are provided, however, to remove or otherwise prevent the lime deposits or if the electrodes can conveniently be replaced, a direct current can be employed within the scope of the present invention. A reversing direct current can also be employed to avoid the lime deposit as shown in the embodiment of the invention illustrated in FIG. 6.

Figure 6:
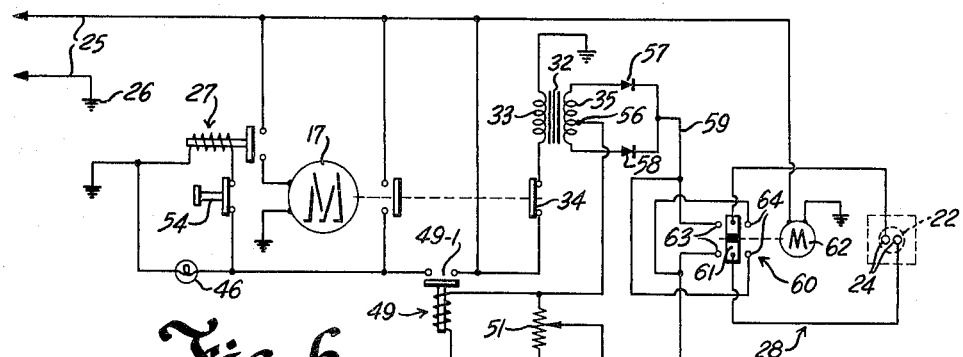
FIG. 6 is a view similar to FIG. 4, illustrating another embodiment of the invention wherein a single portion of the resin bed is checked.

Referring particularly to FIG. 6, the circuit of motor 17 and solenoid 27 generally corresponds to the embodiment illustrated in FIG. 4 and corresponding elements in the embodiments of FIGS. 4 and 6 carry corresponding numbers.

Referring particularly to FIG. 6, the motor 17 is connected to the power supply lines 25 by the solenoid 27 as in the embodiment illustrated in FIG. 4. A switch 54 is also provided to open the circuit to solenoid 27 during the initial establishment of the regeneration cycle. Solenoid 27 is connected across the power lines 25 in series with the above disconnect switch 54 and the sensing relay contacts 49–1 of the D.C. relay 49. The D.C. relay 49 is connected across the output of the sensing circuit 28 in parallel with the adjustable hardness resistor potentiometer 51.

The sensing circuit 28 of the embodiment of the invention illustrated in FIG. 6 includes a transformer 32 connected to the power lines 25 in series with the motor actuated switch 34. The sensing circuit 28 is consequently continuously energized except as hereinafter described. The secondary 35 of the transformer 32 is provided with a center tap 56 which is connected directly to one side of solenoid 49 and the potentiometer 51. A pair of oppositely polarized rectifiers 57 and 58 are connected in series across the complete secondary 35. A lead 59 is connected to the junction between the rectifiers 57 and 58 and connected to the opposite side of the relay 49 and potentiometer 51 in series with the electrodes 24 of test cell 22 by a timer switch 60. As more fully described hereinafter, the timer switch 60 is adapted to reverse the direction of current flow between the electrodes 24 and to thus apply a reversing direct current through the test cell 22.

However, a direct current is continuously supplied to the relay 49 in accordance with the conductivity of the test cell 22. During one-half cycle of the alternating current flow established by secondary 35, the current flows as follows: from secondary 35 through rectifier 57, timer switch 60 and test cell 22 to relay 49 and then back to the center tap 56 of the secondary 35. The rectifier 58 blocks current flow directly from the then conducting rectifier 57 back to the opposite side of secondary 35. During the opposite half-cycle of current, the flow is as follows: from secondary 35 through rectifier 58, timer switch 60 and test cell 22 to relay 49 and then back to the center tap 56 of the secondary 35. Rectifier 57 blocks current flow directly from the then conducting rectifier 58 back to the opposite side of secondary 35.

Thus, when the activity of the bed is effective to soften water, the current to the relay 49 is sufficient to hold the relay contact 49–1 open, and prevent energization of the motor 17 and establishment of the regeneration cycle. However, as previously described, if the activity of the resin-water system adjacent electrode 24 decreases to a preselected level, the relay 49 drops out and relay contacts 49–1 close to establish the regeneration cycle.

The illustrated timer switch 60 is a double-pole, double-throw variety having a switch arm 61 connected to and continuously driven by a small timer motor 62. The switch arm 61 is connected to the electrodes 24 and is a dual contact arm to selectively connect the electrodes 24 in circuit. The switch 60 also includes a first pair of contacts 63 and a second pair of contacts 64. The contacts 63 are connected respectively to the lead 59 and to the adjacent side of the relay 49 and potentiometer 51. When the switch arm 61 engages the contacts 63, the electrodes 24 are connected in series with the relay 49 and potentiometer 51. As illustrated in FIG. 6, the left-hand electrode 24 is connected to line 59 and the right-hand electrode 24 is connected to the relay 49 and the potentiometer 51.

The timer contacts 64 are also connected to line 59 and to relay 49 and potentiometer 51. However, when switch arm 61 engages contact 64 to connect the electrodes 24 in series with the relay 49, the left-hand electrode 24 is now connected to the relay 49 whereas the right-hand electrode 24 is connected to the jumper lead 59. Consequently, the current flow in test cell 22 is alternately from the left-hand electrode 24 and from the right-hand electrode 24 in accordance with the timed movement of switch arms 61 by motor 62.

As shown in FIG. 6, the relay 49 must be continuously energized to maintain conacts 49–1 open to prevent establishment of the regeneration cycle. Consequently, the movement of the switch arm 61 must be exceedingly rapid because if a single switch arm is employed, there is at least a momentary period when the arm 61 is in a position disconnected from both sets of contacts 63 and 64 and consequently, the current to the relay 49 is cut off. The relay 49 inherently has a certain time response required for action and consequently it is only necessary to cause the timer arm to move more rapidly than the time response of the relay to maintain relay 49 energized.

An alternative construction would employ separate contact arms for the respective sets of contacts 63 and 64. Then it would be possible to simultaneously open the one circuit and complete the other circuit without establishing any period when the relay 49 was deenergized.

Generally, the functioning of the embodiment of the invention illustrated in FIG. 6 corresponds to the functioning of the control circuit illustrated in FIG. 4. The timer 60 is preferably set to reverse the connection of the test cell 22 in the circuit every minute or so. The timer 60 thus establishes a reversing D.C. current through the test cell 22 which would correspond to a very low frequency alternating current. By reversing the polarity of the electrodes, the tendency to deposit lime and the like upon the electrodes as a surface film is reduced.

As a practical consideration, direct current relays normally require a relatively large current differential between drop-out and pull-in of the relay armature. Normally, the current differential resulting from the difference in the conductivity of the resin bed will not be sufficiently great to establish the current differential necessary to operate the standard commercially produced direct current relay.

A standard relay may be employed by actuating switch 34 in the following manner. Switch 34 is maintained connected in series with the primary 33 to the sensing transformer 32 and is coupled to the motor 17 to close during the backwash cycle of the softener or the like. During the backwash cycle, a weak brine solution exists in the softener 1 and consequently the conductivity of the test cell 22 will be substantial. The output current of the sensing circuit 28 is, therefore, correspondingly relatively high and readily energizes the relay 49 to open the contacts 49–1. Once the contacts 49–1 have been opened, the current attendant the regenerated softener bed is sufficient to hold the contact 49–1 open. The motor 17 continues to drive the valve to complete the regeneration cycle in the apparatus and return to standby. When the bed again becomes exhausted, the sensing circuit 28 detects the exhausted status and triggers the regeneration cycle, as previously described.

The circuit of FIG. 6, as described, relies upon the current in relay 49 which decreases to the drop-out level such that the relay armature closes contacts 49-1 incident predetermined exhaustion of the bed 10 adjacent electrodes 24. The circuit of FIG. 6 can also be operated to function in response to the pull-in current of the relay 49. The pull-in current is present when the bed is regenerated. The pull-in current is that amplitude of current flow sufficient to energize relay 49 to positively open the contacts 49-1 as follows: The switch arm 61 of timer switch 60 is maintained in a neutral position during each reversal of position. Relay 49 is then de-energized and the armature is released to close contacts 49-1. The switch arm 61 then closes the circuit through contacts 63 or 64. If the bed adjacent electrodes 24 is regenerated, pull-in current is established and the relay 49 operates to open contacts 49-1. If the bed adjacent electrodes 24 is exhausted to a preselected level, pull-in current is not established and relay 49 maintains contacts 49-1 closed to establish the regeneration cycle.

In the latter functioning of timer switch 60, the switch arm 61 must close to complete the sensing circuit and permit energization of relay 49 prior to closing of solenoid contacts 27-1. Relay contacts 49-1 will then open the circuit to solenoid 27 and prevent establishment of the regeneration cycle until predetermined exhaustion of the bed 10 occurs.

The level of exhaustion of bed 10 at which initiation of the regeneration cycle is established may also be varied by adjusting the length and/or spacing of the electrodes through suitable physical movement thereof. The projection of the electrodes, for example, into the bed may be adjusted to vary the effective cooperative surfaces exposed in the bed.

The present invention provides an extremely accurate and sensitive means for detecting the necessity for regeneration of a water softening apparatus. The method and apparatus is simple, inexpensive and easily operated with a minimum of skill and experience. Further, the system is dependable and efficient, and is particularly adapted for use in small, residental-type water softeners as well as commercial installations.

Various modes of carrying out the invention are contemplated as being within the scope of the following claims particularly pointing out and distinctly claiming the subject matter which is regarded as the invention.

I claim:

1. In a control for sensing a regeneration requirement of an ion exchange bed adapted to have a fluid passed therethrough, a first pair of electrode means embedded in the downstream portion of the ion exchange bed, a second pair of electrode means embedded upstream of the first pair of electrode means, an electroresponsive detector, a bridge circuit including said electroresponsive detector in the output circuit and said first and second pairs of electrode means connected in parallel branches of the bridge circuit to establish current flow to the electroresponsive detector in accordance with the difference in the conductivity of the upstream and the downstream portions of the bed, and impedances connected in the remaining branches of the bridge circuit, at least one of said impedances being adjustable to allow setting of the level of energization of the electroresponsive detector for any given current flow through said first and second electrode means.

2. In an ion exchange regeneration control for sensing a regeneration requirement of an ion exchange bed adapted to have a fluid passed therethrough, a first pair of electrodes embedded in a downstream portion of the bed, a second pair of electrodes embedded in a portion of the bed downstream of the first pair of electrodes, an electroresponsive means, sensing circuit means including means for establishing current flow through said electrodes and said electroresponsive means and operatively actuating the electroresponsive means when a predetermined differential in current flow exists through the pairs of electrodes, timer means having circuit controlling means adapted to intermittently complete said circuit for energization, latch means responsive to operative actuation of said electroresponsive means to open the sensing circuit to prevent application of power across said electrodes, regenerating means adapted to establish a regeneration cycle, second timer means adapted to condition said regeneration means for operation, circuit means interconnecting said regeneration means and said latch means to override said second timer means and allow actuation of the regeneration means only after actuation of the electroresponsive means, and means responsive to the regeneration cycle to reset the latch means.

3. In an ion exchange regeneration control for sensing a regeneration requirement of an ion exchange bed adapted to have a fluid passed therethrough, a first pair of electrodes embedded in a downstream portion of the bed, a second pair of electrodes embedded in a portion of the bed downstream of the first pair of electrodes, an electroresponsive means, sensing circuit means connecting said pair of electrodes and said electroresponsive means to actuate the electroresponsive means incident a predetermined differential in current flow through the electrodes, timer means having circuit controlling means adapted to intermittently complete said circuit for energization, latch means responsive to actuation of said electroresponsive means to open the sensing circuit to prevent application of power across said electrodes, regenerating means adapted to establish a regeneration cycle, second timer means adapted to condition said regeneration means for operation, circuit means interconnecting said regeneration means and said latch means to override said second timer means and allow actuation of the regeneration means only after actuation of the electroresponsive means, and means responsive to the regenerating means to simultaneously open the circuit to the latch means and the sensing circuit to reset the latch means and to isolate the sensing circuit during the regeneration cycle.

4. In an ion exchange regeneration control for sensing a regeneration requirement of an ion exchange bed adapted to have a fluid passed therethrough, a first pair of electrodes embedded in a downstream portion of the bed, a second pair of electrodes embedded in a portion of the bed downstream of the first pair of electrodes, an electroresponsive means, sensing circuit means connecting said pairs of electrodes and said electroresponsive means to actuate the electroresponsive means incident a predetermined differential in current flow through the electrodes, timer means having circuit controlling means adapted to intermittently complete said sensing circuit for energization, regenerating means adapted to establish a regenerating cycle, said timer means including circuit controlling means connecting said regenerating means for energization substantially less often than said sensing circuit, relay means connected in circuit with said electroresponsive means and energized incident actuation of the electroresponsive means, said relay means having a first set of contacts in series with the first circuit controlling means and having a second set of contacts in series with the relay means and in series with the second circuit controlling means, actuation of said relay means isolating the sensing circuit and conditioning said regenerating means for energization incident actuation of the second circuit controlling means, and circuit controlling means responsive to the regenerating means to open the circuit to the relay means and to said sensing circuit.

5. In an ion exchange regeneration control for sensing a regeneration requirement of an ion exchange bed adapted to have a fluid passed therethrough and for triggering a regeneration means, a first pair of electrodes embedded in a downstream portion of the bed, a second pair of electrodes embedded in a portion of the bed downstream of the first pair of electrodes, relay means having an operating winding and a set of output contacts, a sensing circuit including said pairs of electrodes connected as a bridge circuit with a pair of impedances, said relay means being connected across the output of the sensing circuit, a continuously driven timer having first contact means intermittently connecting said sensing circuit to a source of power and having second contact means intermittently connecting said regenerating means to a source of power, a latch relay having a latch winding connected to a source of power in series with said first switch means and said output contacts and having first latch contacts adapted to disconnect the sensing circuit from the source of power and second latch contacts adapted to connect the latch winding to the source of power, said second latch contacts being connected in series with the second switch means, a third switch means adapted to connect the regenerating means to a source of power, a fourth switch means adapted to open the circuit to said sensing means, and means in said regenerating means actuating said third and fourth switch means after predetermined energization of the regenerating means to establish the regenerating cycle and to return to normal position after a period corresponding to the regenerating cycle.

6. In a control for sensing a regeneration requirement of an ion exchange bed adapted to have a liquid passed therethrough and having an electrically actuated valve adapted to establish the regeneration cycle, a pair of electrode means embedded in the downstream portion of the ion exchange bed, means to impress electrical power across the electrode means in the presence of the liquid to establish a current flow proportional to the conductivity of the bed, electroresponsive means connected in a circuit with said electrode means for energization in accordance with current flow between the electrode means and having output contact means, said electroresponsive means being adapted to close the contact means incident to a predetermined current flow through the electroresponsive means, and preset means adapted to adjust the proportional energization of the electroresponsive means to adjust the level of current flow between the electrode means and thereby control the actuation of the electroresponsive means.

7. In a control for sensing a regeneration requirement of an ion exchange bed adapted to have a fluid passed therethrough and having an electrically actuated valve adapted to establish the regeneration cycle, a pair of electrode means embedded in the downstream portion of the ion exchange bed, circuit means to impress power across the electrode means to establish a current flow proportional to the conductivity of the bed, electroresponsive means connected in a series circuit with said electrode means, means connecting said electroresponsive means to said valve to trigger the valve incident to a predetermined current flow between said electrode means, and means responsive to preselective valve operation to open said circuit means.

8. In a softener control for sensing a regeneration requirement of an ion exchange bed adapted to have a fluid passed therethrough and having an automatic regeneration unit, spaced electrode means embeded in the downstream portion of the ion exchange bed, a full-wave rectifier having an input in circuit with the electrode means, an alternating current source connected across the series connected rectifier and electrode means to establish an alternating current flow through the ion exchange bed, a direct current electroresponsive means connected across the output of the rectifier and adapted to be connected to the automatic regeneration unit to initiate operation of the regeneration unit, and means responsive to actuation of the regeneration unit to open the circuit to said electrode means.

9. In a softener control for sensing a regeneration requirement of a water softener having ion exchange bed adapted to have the water passed therethrough and having an automatic regeneration unit, spaced electrode means embedded in the downstream portion of the ion exchange bed, a full-wave rectifier having an input in series with the electrode means, a low voltage alternating current source connected across the series connected rectifier and electrode means to establish an alternating current flow through the ion exchange bed, a direct current electroresponsive means connected across the output of the rectifier and adapted to be connected to the automatic regeneration unit to initiate operation of the regeneration unit.

10. In a softener control for sensing a regeneration requirement of a water softener having an ion exchange bed adapted to have the water passed therethrough and having an automatic regeneration unit, spaced electrode means embedded in the downstream portion of the ion exchange bed, a full-wave rectifier having an input in series with the electrode means, an alternating current source connected across the series connected rectifier and electrode means to establish an alternating current flow through the ion exchange bed, a direct current electroresponsive means connected across the output of the rectifier and adapted to be connected to the automatic regeneration unit to trigger the regeneration unit, and a variable impedance shunted across said direct current electroresponsive means to allow presetting of the effective conductivity of the bed to trigger the regeneration unit.

11. In a softener control for a water softener having an ion exchange bed within a tank and a bed regenerating unit adapted to be selectively connected to the tank by a motor-driven valve having a motor adapted to be connected to a power source, a pair of electrodes embedded within the downstream portion of the bed, a full-wave rectifier having a pair of input connections and a pair of output connections, a transformer having a secondary connected in series with said pair of electrodes and the input connections and having a primary, a normally closed switch adapted to connect the primary to the power source to establish an alternating current flow through the bed, an electromagnetic device connected to the output connections of the rectifier and having contacts, a variable resistor connected in parallel with said electromagnetic device to allow adjustment of the operating level of the electromagnetic device, a motor contactor connected in circuit with said contacts and the power source to control energization of the motor, and a latch switch connected in an independent energizing circuit to the motor, said motor being operatively coupled to said normally closed switch and said latch switch to respectively open the circuit to the primary winding and complete the independent energizing circuit after predeterminal contactor energization.

12. In a softener control for a water softener having an ion exchange bed within a tank and a bed regenerating unit adapted to be selectively connected to the tank by a motor-driven valve having a motor adapted to be connected to a power source, a pair of electrodes embedded within the downstream portion of the bed, a full-wave rectifier having a pair of input connections and a pair of output connections, a transformer having a secondary connected in series with said pair of electrodes and the input connections of the rectifier and having a primary, a normally closed switch adapted to connect the primary to the power source to establish an alternating current flow through the bed, an electromagnetic device connected to the output connections of the rectifier and having contacts, a variable resistor connected in parallel with said electromagnetic device to allow adjustment of the operating level of the electromagnetic device, a motor-driven timer having a motor connected across the power source and a time switch periodically closed by said motor, a motor contactor connected in circuit with said contacts and the power source and said time switch to control energization of the motor, a manually controlled by-pass switch connected in parallel with said time switch to allow initial adjustment of the variable resistance, and a latch switch connected in an independent energizing circuit to the motor, said motor being operatively coupled to said normally closed switch and said latch switch to respectively open the circuit to primary winding and complete the independent energizing circuit after predeterminal contactor energization.

13. In a control for sensing a regeneration requirement of an ion exchange bed adapted to have a fluid passed therethrough and for triggering an automatic motor-driven regeneration unit, spaced electrode means in said bed, circuit means to impress power across the electrode means to establish an actuating signal, means responsive to said actuating signal to initiate operation of the motor of the motor-driven regeneration unit, and switch means operatively actuated by the motor to open the circuit to the electrode means incident to the beginning of the regeneration cycle, said switch being held open at least during the charging portion of the regeneration cycle.

14. In a control for sensing a regeneration requirement of an ion exchange bed adapted to have a fluid passed therethrough and for triggering an automatic motor-driven regeneration unit, spaced electrode means in said bed, circuit means to impress power across the electrode means to establish an actuating signal, means responsive to said actuating signal to trigger operation of the motor of the motor-driven regeneration unit, circuit latch means actuated by said motor to maintain the motor energized for a regenerating cycle, and switch means operatively actuated by the motor to open the circuit to the electrode means incident to the beginning of the regeneration cycle, said switch being held open at least during the charging portion of the regeneration cycle.

15. In a control for sensing a regeneration requirement of an ion exchange bed adapted to have a fluid passed therethrough and an automatic motor-driven regeneration unit, spaced electrode means in said bed, circuit means to impress power across the electrode means to establish an actuating signal incident to predetermined depletion of the bed, electroresponsive means responsive to said actuating signal to condition the motor of the motor-driven regeneration unit, an over-riding timer in circuit with the motor and the electroresponsive means to restrict the regeneration cycle to preselected periods, switch means operatively actuated by the motor to open the circuit to the electrode means incident to the beginning of the regeneration cycle, said switch being held open at least during the charging portion of the regeneration cycle, and second switch means operatively actuated by the motor to maintain the motor energized for a complete regenerating cycle.

16. In a control for sensing a regeneration requirement of an ion exchange bed adapted to have a fluid passed therethrough, a first pair of electrode means embedded in the downstream portion of the ion exchange bed, a second pair of electrode means embedded upstream of the first pair of electrode means, an electroresponsive detector, a bridge circuit including said electroresponsive detector in the output circuit and said first and second pairs of electrode means connected in parallel branches of the bridge circuit to establish current flow to the electroresponsive detector in accordance with the difference in the conductivity of the upstream and the downstream portions of the bed, and impedances connected in the remaining branches of the bridge circuit.

17. In a sensing device for detecting regeneration requirements for an ion exchange bed constituting a passage for a liquid, an alternating current electroresponsive means adapted to trigger a regeneration cycle, spaced electrode means adapted to be embedded directly in the ion exchange bed and connected in circuit with said electroresponsive means to control the power in said electroresponsive means, and means to maintain an alternating current power supply connection to the electrode means and the electroresponsive means prior to establishment of a regeneration cycle to control the triggering of a regeneration cycle in response to the conductivity of the water-ion exchange bed.

18. In a sensing device for triggering a self-cycling electrically operated regeneration unit adapted for connection to an ion exchange bed constituting a passage for a fluid, an alternating current relay having normally open contacts connected to control the regeneration device, a sensing circuit including spaced electrodes adapted to be embedded within the ion exchange bed and establishing an output signal connected to the relay, said output signal being responsive to the conductivity of the bed adjacent the electrodes, switch means connecting said sensing circuit to an alternating current supply, and said switch means being biased to a closed position and coupled to said regeneration device to open during a regeneration cycle.

19. In an ion exchange regeneration control for sensing a regeneration requirement of an ion exchange bed adapted to have a fluid passed therethrough and for triggering a regeneration means, a first pair of electrodes embedded in a portion of the bed, a second pair of electrodes embedded in a portion of the bed downstream of the first pair of electrodes, relay means having an operating winding and a set of output contacts, a sensing circuit including said pairs of electrodes connected as a bridge circuit with a pair of impedances, said relay means being connected across the output of the sensing circuit, said output contacts being connected in circuit with the regeneration means, switch means biased to a closed circuit position connecting the input of the bridge circuit to alternating current supply lines, said regeneration means being coupled to said switch means to open the switch means during a regeneration cycle, and switch means actuated by said regeneration means to establish a regeneration cycle after predetermined operation of the regeneration means.

20. In an ion exchange regeneration control for sensing a regeneration requirement of an ion exchange bed adapted to have a fluid passed therethrough and for triggering a regeneration means, a pair of electrodes embedded in a downstream portion of the ion exchange bed, a direct current source, a direct current relay having normally closed contacts connected in circuit with the regeneration means, switch means having a first position connecting said electrodes and said relay in a series circuit to said direct current source to establish current flow to the relay in accordance with the effective conductivity of the resin between said electrodes, said switch means having a second position establishing the series circuit with the electrodes reversely connected to establish a reverse current between the electrodes, and a timer adapted to continuously move the switch means between said first position and said second position.

21. In an ion exchange regeneration control for sensing a regeneration requirement of an ion exchange bed adapted to have a fluid passed therethrough and for triggering a regeneration means, a pair of electrodes embedded in a downstream portion of the ion exchange bed, a direct current source, a direct current relay having normally closed contacts connected in circuit with the regeneration means, switch means having a first position connecting said electrodes and said relay in a series circuit to said direct current source to establish current flow to the relay in accordance with tthe effective conductivity of the resin between said electrodes, said switch means having a second position establishing the series circuit with the electrodes reversely connected to establish a reverse current between the electrodes, and a timer adapted to continuously move the switch means between said first position and said second position, a first interlocking switch adapted to open the direct current source, a second interlocking switch adapted to maintain energization of the regeneration means, said second interlocking switch being coupled to said regeneration means to close the second interlocking switch after predetermined operation of the regeneration means to establish a complete regeneration cycle, said first interlocking switch being coupled to said regeneration means and closed during the back-washing period of the regeneration cycle to energize said direct current relay and positively open the associated normally closed contacts.

References Cited by the Examiner

UNITED STATES PATENTS

| | | | |
|---|---|---|---|
| 1,893,933 | 1/1933 | Dotterweich | 210—96 |
| 1,928,384 | 9/1933 | McCanna | 210—25 X |
| 2,711,995 | 6/1955 | Sard | 210—25 |
| 2,736,637 | 2/1956 | Juda | 210—96 X |

MORRIS O. WOLK, *Primary Examiner.*